United States Patent [19]
Thompson

[11] 3,868,226
[45] Feb. 25, 1975

[54] REACTION VESSELS
[75] Inventor: Brian Hoyle Thompson, Harpenden, England
[73] Assignee: The Gas Council, London, England
[22] Filed: May 25, 1972
[21] Appl. No.: 256,834

[30] Foreign Application Priority Data
June 4, 1971  Great Britain..................... 19014/71

[52] U.S. Cl........................ 23/284, 48/93, 208/107, 208/153
[51] Int. Cl........................... B01j 1/00, C10g 13/18
[58] Field of Search............... 23/284, 288 S, 288 E; 48/93, 213; 208/107, 127, 153

[56] References Cited
UNITED STATES PATENTS
| | | | |
|---|---|---|---|
| 2,533,666 | 12/1950 | Gunness | 23/288 S X |
| 2,756,191 | 7/1956 | Fritz | 23/288 S UX |
| 3,484,219 | 12/1969 | Dent et al. | 23/284 X |

Primary Examiner—Joseph Scovronek
Attorney, Agent, or Firm—Larson, Taylor and Hinds

[57] ABSTRACT

An apparatus for performing a chemical reaction between a reactant gas and a fluid material to produce a gaseous product comprises an elongated thermally insulated reaction vessel, to be held in a vertical position and to contain a fluidised bed, having mounted within it at least one dividing member which is shorter than the internal length of the vessel and which divides the interior of the vessel into at least two regions, at least one to act as a riser for the fluidised bed and a region surrounding the rise or risers to act as a downcomer therefor all the regions being in communication with each other beyond the ends of the dividing member or members, means for supplying the reactant gas at the lower end of the reaction vessel so as to maintain at least one zone of the ascending particles in the fluidised state in the riser or risers and a zone of descending particles in the fluidised state in the downcomer, at least one nozzle associated with each riser within the reaction vessel for injecting or atomising the fluid material into the reactant gas and an outlet for a gaseous reaction product at the upper end of the reaction vessel said outlet comprising a duct which extends downwardly through the reaction vessel.

3 Claims, 1 Drawing Figure

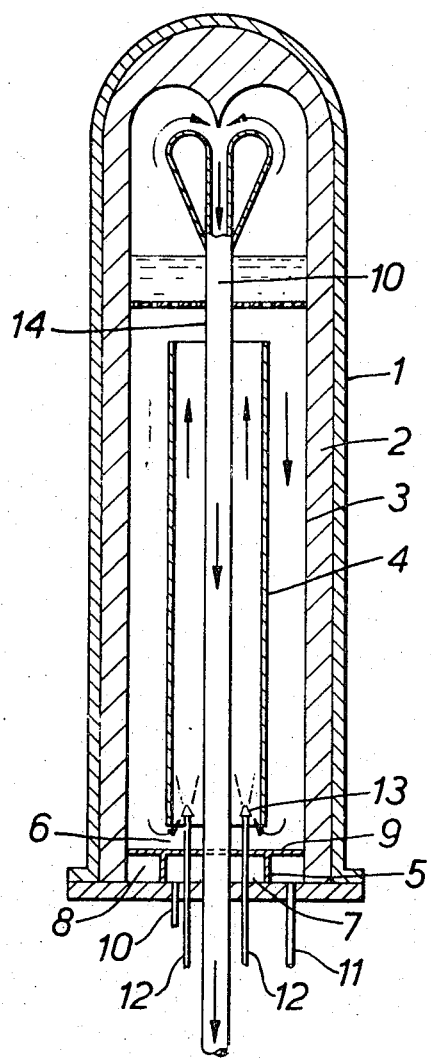

3,868,226

REACTION VESSELS

BACKGROUND OF THE INVENTION

This invention relates to apparatus used in the performing of chemical reactions and is particularly concerned with reaction vessels wherein a chemical reaction between a gas and a fluid material is used to produce a gaseous product.

In one such reaction process described in British Pat. No. 1,154,321 the fluid reactants are used to maintain a bed of particles in a fluidised state within the reaction vessel, the fluid reactant is injected or atomised into the reactant gas within the fluidised bed and the gaseous product is recovered from above the level of the fluidised bed. It has now been shown that under certain operating circumstances, a pressure differential may be established between the reaction vessel and the gas outlet duct leading from the vessel and that the difference in pressure is due to a deposit formed in the neck of the reaction vessel leading to the outlet duct. For example, when the fluid reactant is crude petroleum and the gas is a hydrogen containing gas, and when the chemical reaction is such that the gaseous product is rich in hydrocarbons the deposit is carbonaceous and consists of material resulting from droplets of the heaviest constituent of the crude petroleum or of the material produced from the droplets by hydrogenation being deposited on the surface by eddy currents in the outgoing gas and subsequently carbonised.

It is therefore an object of the present invention to produce an improved form of construction whereby any tendency towards the formation of such carbonaceous deposit is minimised.

SUMMARY OF THE INVENTION

According to the invention there is provided an apparatus for performing a chemical reaction between a reactant and a fluid material to produce a gaseous product, which apparatus comprises an elongated thermally insulated reaction vessel, to be held in a vertical position and to contain a fluidised bed, having mounted within it at least one dividing member which is shorter than the internal length of the vessel and which divides the interior of the vessel into at least two regions, at least one to act as a riser for the fluidised bed and a region surrounding the rise or risers to act as a downcomer therefor, all the regions being in communication with each other beyond the ends of the dividing member or members, means for supplying the reactant gas at the lower end of the reaction vessel so as to maintain at least one zone of ascending particles in the fluidised state in the riser or risers and a zone of descending particles in the fluidised state in the downcomer, at least one nozzle associated with each riser within the reaction vessel for injecting or atomising the fluid material into the reactant gas and an outlet for a gaseous reaction product at the upper end of the reaction vessel said outlet comprising a duct which extends downwardly through the reaction vessel.

Preferably, the outlet duct is circular and extends co-axially within the reaction vessel and the fluidised bed is contained within the annulus formed between the duct and the reaction vessel.

The upper end of the reaction vessel and the associated upper portion of the outlet duct are aerodynamically shaped to facilitate a substantially eddy free and high velocity gas flow from the reaction vessel.

BRIEF DESCRIPTION OF THE DRAWING

The invention is illustrated, solely by way of example, in the accompanying drawing which is a sectional side elevation of a thermally insulated reaction vessel used in the hydrogenation of oils.

DESCRIPTION OF THE PREFERRED EMBODIMENT

Referring to the drawing, within a pressure vessel 1 and separated from it by insulation 2 there is a cylindrical reaction vessel 3 within which is a coaxial tube 4 (the riser) mounted so as to be spaced away from a shorter tube 5 by a gap 6. There is a shallow compartment (the distributor box) at the base of the vessel which is divided by the shorter tube 5 into a central cylindrical chamber 7 and an annular chamber 8. These chambers provide means for uniformly distributing gas into the cylindrical and annular spaces above the top surface of the compartment, which is a perforated plate 9.

Gas to aerate the bed is supplied through pipes 10 and 11 the pipes being arranged in concentric rings such that the pipes 10 discharge into chamber 7 and pipes 11 lead to chamber 8.

Oil supply pipes 12 which are of co-axial type enter through the base of the reaction vessel and extend into the bottom of the riser 4 and terminate with atomising nozzles 13.

The upper end of the reaction vessel communicates with a gas offtake or outlet duct 14 which extends centrally downwards and exits through the base of the vessel.

The upper end of the duct 14 is flared outwards and shaped to correspond with the internal configuration of the top of the reaction vessel, the configuration being such as to promote a non turbulent gas flow from the vessel into the duct.

The offtake duct 4 passes through and is surrounded for most of its length by the bed material and the riser tube 4.

The oil supply pipes 12 are also arranged at a suitable spacing around the duct.

The reaction vessel is also provided with a pipe (not shown on the drawing) located in the top of the vessel. The particles required to form the fluidised bed are introduced into the vessel through this pipe. The vessel is also provided with a second pipe (again, not shown in the drawing), at the base of the vessel. The particles of the fluidised bed can be withdrawn through this pipe when necessary.

In operation, sufficient particulate coke is introduced to cover the upper end of the central tube and substantially the whole quantity is caused to circulate up the whole length of the central riser, i.e. tube 4 and down the whole length of the downcomer i.e. the annulus between the tube 4 and the inside of the reaction vessel 3, by introducing a large proportion of the hydrogenating gas through pipe 10 into the chamber 7 and thence into the base of the central tube. Sufficient hydrogenating gas is introduced through pipe 11 into the chamber 3 and thence into the annulus to ensure proper fluidisation of the descending solid particules.

By preheating the hydrogenating gas, the whole circulating bed can be brought to a temperature at which reaction is initiated. Oil is then introduced. The oil is supplied through an inner tube in pipe 12 which is enclosed within an outer tube while a supply of hydrogenating gas to assist atomisation flows up the annulus between the tubes. The oil and the atomising hydrogenating gas meet at or near the atomising nozzle 13. This mixture then meets the ascending mixture of hot hydrogenating gas and coke particles in the riser. The hydrogenation reaction then starts, and the temperature rises as the reactants react. The temperature is brought under control by the fluidised bed and by adjustment of the preheat conditions.

More oil is added, the heat released by the reaction increases and the preheat temperature may then be lowered accordingly. The hydrogenation reaction is substantially completed by the time the mixture reaches the top of the riser. The product gases leave the reaction vessel through the pipe at the top of the vessel, and the coke particles remain in the circulating bed and travel down the downcomer. The circulating bed ensures uniformity of temperature, the level of which can be controlled by appropriate adjustment of the preheat temperature.

It will be appreciated that product gas flowing into the offtake duct is normally at a high temperature and that in some circumstances the reaction is incomplete when the gases leave the reaction vessel. Temperatures can therefore rise and lead to after reaction and possible carbon formation within the duct. By surrounding the offtake duct with the fluidised bed the duct walls are maintained at a temperature close to the desired reaction temperature and as a consequence at a substantially uniform temperature localised cooling and possible carbonaceous deposition is minimised. Since the offtake duct is straight with less risk of erosion, the gas flow can be maintained at high velocities and the formation of eddies is reduced. The straight internal offtake duct also facilitates the use of rods to remove any carbon formation without shut-down of the plant.

The invention has been described in relation to a reaction vessel having a single central offtake duct but if desired the vessel may be provided with multiple offtake ducts and in particular the invention may be applied to reaction vessels in which the fluidised bed is circulated through a multi riser system.

We claim:

1. An apparatus for performing a chemical reaction between a reactant gas and a fluid material to produce a gaseous product comprising an elongated thermally insulated reaction vessel in a vertical position and when in use containing a fluidised bed, having mounted within it at least one dividing member which is shorter than the internal length of the vessel and which divides the interior of the vessel into at least two regions, at least one to act as a riser for the fluidised bed and a region surrounding the riser or risers to act as a downcomer therefor, all the regions being in communication with each other beyond the ends of the dividing member or members, separate means for supplying the reactant gas at the lower end of the reaction vessel so as to maintain a zone of ascending particles in the fluidised state in the riser or risers and a zone of descending particles in the fluidised state in the downcomer, at least one nozzle associated with each riser within the reaction vessel for injecting the fluid material into the reactant gas and an outlet for a gaseous reaction product at the upper end of the reaction vessel, said outlet comprising a duct which opens at a point substantially above said fluidised bed to prevent entry of particles therein and extends downwardly through the reaction vessel to exit through the base thereof.

2. Apparatus according to claim 1 wherein the outlet duct is circular and extends co-axially within the reaction vessel.

3. Apparatus according to claim 2 wherein the upper end of the reaction vessel and the associated upper portion of the outlet duct are flared shaped to facilitate a substantially eddy free and high velocity gas flow from the reaction vessel.

* * * * *